Dec. 22, 1964  E. COULON ETAL  3,162,078
APPARATUS FOR PREPARING MITERED TUBULAR JOINTS
Original Filed Oct. 1, 1959  2 Sheets-Sheet 1
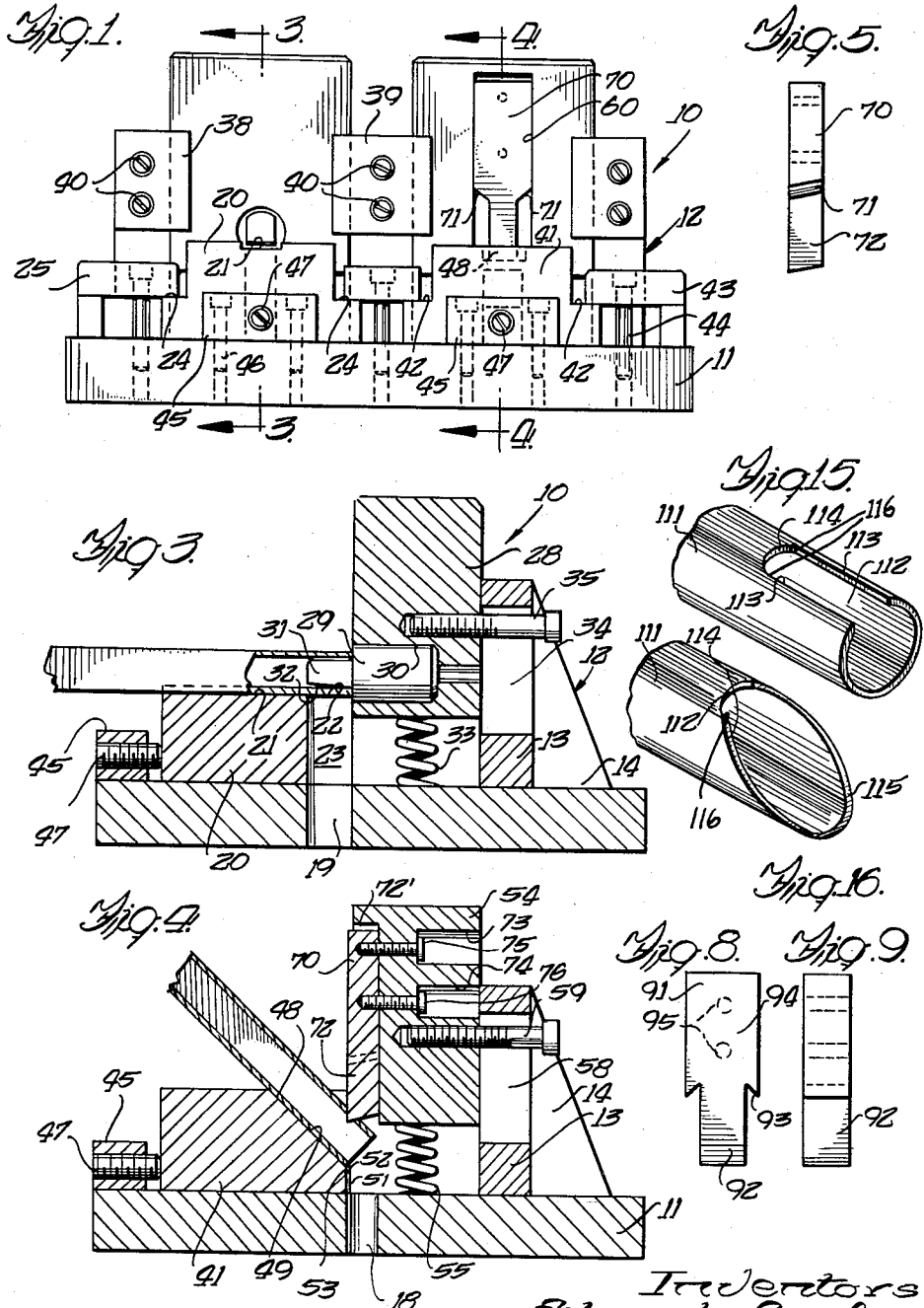
Inventors
Edward Coulon
Harry May
Hilmond O. Vogel
Attorney Dec. 22, 1964   E. COULON ETAL   3,162,078
APPARATUS FOR PREPARING MITERED TUBULAR JOINTS
Original Filed Oct. 1, 1959   2 Sheets-Sheet 2
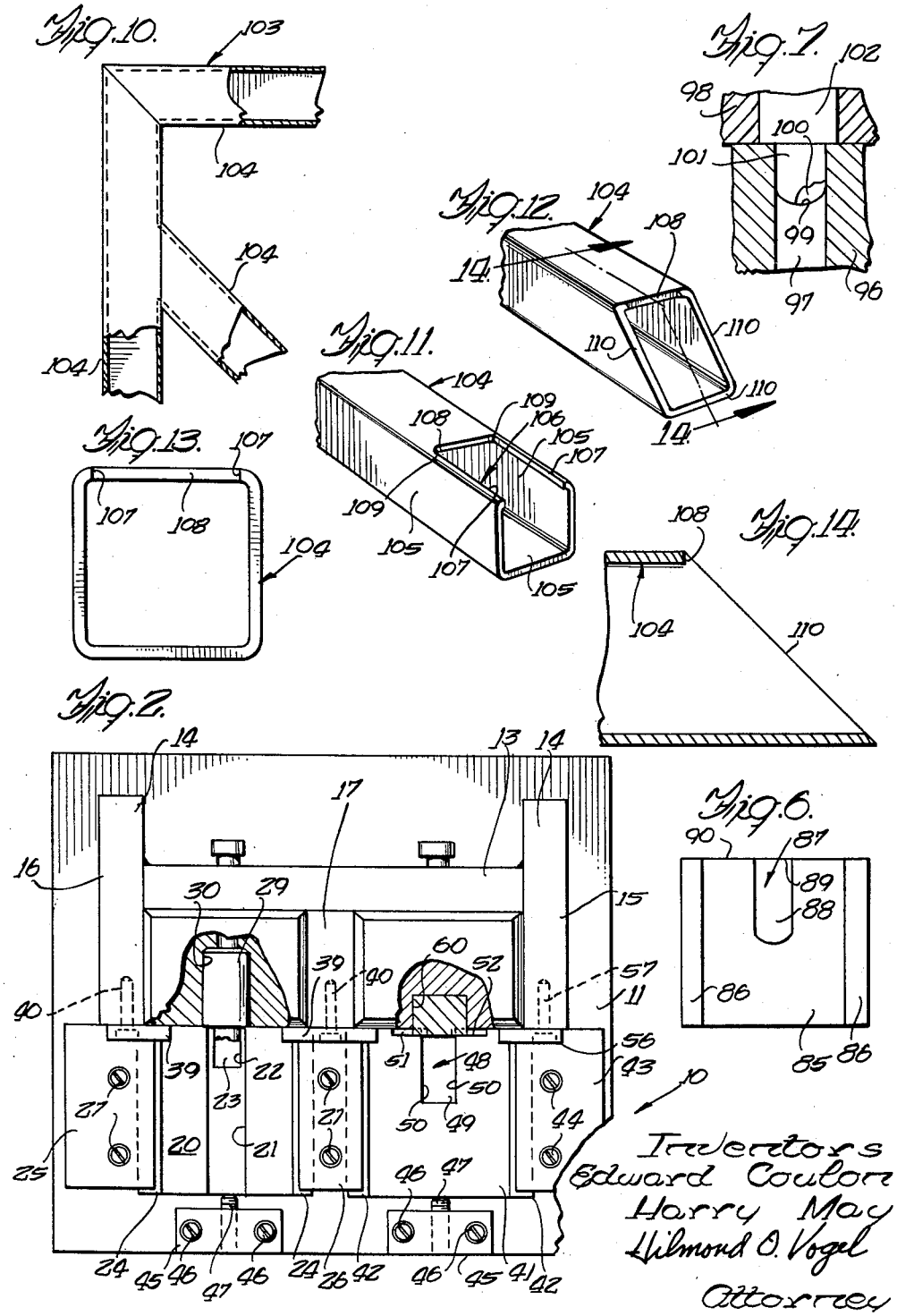

United States Patent Office 3,162,078
Patented Dec. 22, 1964

3,162,078
APPARATUS FOR PREPARING MITERED TUBULAR JOINTS
Edward Coulon, Chicago, and Harry May, Lombard, Ill., assignors to Vogel Tool & Die Corporation, Melrose Park, Ill., a corporation of Illinois
Original application Oct. 1, 1959, Ser. No. 843,796, now Patent No. 3,074,302, dated Jan. 22, 1963. Divided and this application Sept. 26, 1962, Ser. No. 234,270
3 Claims. (Cl. 83—191)

This application is a division of our application Serial No. 843,796, filed October 1, 1959, for Method and Apparatus for Preparing Mitered Tubular Joints, now Patent No. 3,074,302, granted January 22, 1963.

This invention relates to an apparatus for shaping the ends of tubing in the preparation of tubular mitered joints.

The preparation of tubular frames, tubular supports, and other tubular structural shapes often requires the mitering of the ends of a pair of tubes so that they may be connected by means of welding or brazing in mitered relation. Both in the welding and brazing of the mitered ends it is extremely desirable that the mitered edges of the tube ends be free of burrs or roughness so that an accurate and smooth joint may be made. Previous methods for preparing tube ends largely consisted of sawing the tube ends at the desired angle. However the sawing operation leaves extensive roughness and burrs, and often requires secondary deburring and smoothing operations. Because of the rough saw-cut edges the secondary operations are usually very expensive and extensive and frequently result in inability to hold the necessary close dimensional tolerances which are required. It is a prime object of this invention, therefore, to provide an improved apparatus for mitering tubular ends in the preparation of tubular joints.

It is still another object to provide an efficient and accurate shearing apparatus for shearing the ends of a tube in the preparation of a mitered joint.

It is a further object to provide an improved apparatus for mitering the ends of a tube, the apparatus doing the slotting of the end of a tube from the inside out and the subsequent removal by a shearing tool of tube end portions whereby a smooth mitered edge is formed, the said mitered edge being accurate and free of burrs so that the mitered tube ends may be jointed by means of brazing or other precision welding methods.

A still further object is to provide an improved apparatus for mitering the ends of tubing the said apparatus being capable of mitering either rectangular or round tubing.

A still further object is the provision of an apparatus consisting of two stations which can be simultaneously operated by an operator for placing a slot in the end of a tube and for simultaneously mitering the end of another tube also placed in the apparatus.

These and further objects will become more readily apparent from a reading of a description when taken in connection with the accompanying sheets of drawings.

In the drawings:

FIGURE 1 is a front elevational view of an apparatus for mitering the ends of rectangular tubing;

FIGURE 2 is a plan view of the apparatus shown in FIGURE 1;

FIGURE 3 is a cross-sectional view taken substantially along the line 3—3 of FIGURE 1;

FIGURE 4 is a cross-sectional view taken substantially along the line 4—4 of FIGURE 1;

FIGURE 5 is a detailed view of a punch used in connection with the apparatus shown in FIGURES 1 through 4;

FIGURE 6 is a detailed plan view of a modified die adapted to be used in connection with the mitering of round tubing;

FIGURE 7 is a fragmentary cross-sectional view through a portion of a modified die member and a punch assembly utilized in connection with the mitering of round tube ends;

FIGURE 8 is a front view of a modified punch used for the mitering of round tubing ends;

FIGURE 9 is a side view of the punch shown in FIGURE 8;

FIGURE 10 is a fragmentary assembly view of a portion of a tubular frame showing mitered tubing joints positioned together prior to a brazing or welding operation;

FIGURE 11 is a perspective view of a tube end in an initial step in a process of preparing a mitered end joint;

FIGURE 12 is a perspective view of a finished rectangular tube end after it has been mitered;

FIGURE 13 is an enlarged front elevational view of the tube end shown in FIGURE 12;

FIGURE 14 is an enlarged cross-sectional view taken along the line 14—14 of FIGURE 12;

FIGURE 15 is a perspective view of a round tube end after a first step in the process of preparing a mitered joint; and FIGURE 16 is a round tube end portion after it has been mitered.

Referring now to FIGURES 1 through 4, a tube mitering apparatus is generally designated by the reference character 10. The apparatus 10 comprises a base-plate 11 to which a housing 12 is secured by suitable means such as welding, etc. The housing 12 comprises a rear wall 13 which is suitably supported and reinforced by means of gussets 14 also secured to the base plate 11. The housing 12 further includes side walls 15 and 16 and a center wall 17. The base plate 11 is provided with a pair of slug clearance slots 18 and 19 disposed between the side walls 15, 16 and the center wall 17.

A first die block 20 includes a recessed cradle 21 which is shaped to conform to a rectangular tube end. The forward end of the die block 20 is provided with a U-shaped cutting edge 22 provided by a recess 23 extending the full depth of the die block 20. The die block 20 is provided with suitable opposed shoulders 24 and is suitably clamped to the base plate 11 by means of clamping pads 25 and 26 and by means of set screws 27 suitably threaded into the base plate 11.

The die block 20 is positioned in a so-called first station and also a punch holder 28 is provided in this station, the said punch holder being positioned for vertical reciprocation between the walls 16 and 17. Punch means in the form of a shank 29 is suitably secured within a bore 30 provided in the punch holder 28. The shank 29 has integrally formed therewith a projecting rectangular shaped punch 31 which is suitably sharpened so as to effect, in operation, a shearing action. Thus the punch is provided with a cutting edge 32 which conforms generally to the U-shaped cutting edge 22.

The punch holder 28 is normally urged upwardly by means of a spring 33 disposed between the lower edge of the punch holder 28 and the base plate 11. A slot 34 is provided in the rear wall 13 immediately in back of the punch holder 28. A stop screw 35 is suitably secured within the punch holder 28 and the stop screw 35 limits the upward travel of the punch holder 28. As best shown in FIGURE 1, the punch holder 28 is held against forward movement by means of clamping plates 38 and 39 suitable secured in position on the housing 12 by means of screws 40.

The second station of the apparatus 10 comprises a die 41 best shown in FIGURES 2 and 4. The die 41 is also provided with opposed shoulders 42 and by means of the clamping pad 26 and a clamping pad 43 the said die 41 is rigidly secured to the base plate 11. The dies 20 and 41 are restrained against forward movement by means of clamp members 45 secured to the base plate 11 by means of screws 46, the said clamp members 45 including adjustable set screws 47 which are screwed into engagement with the forward faces of the dies 20 and 41. The die 41 also includes a cradle 48, disposed at 45° acute angle with respect to the base plate 11, the said cradle 48 having a bottom wall 49 conforming generally to the shape of the rectangular tube end which is to be operated upon. The cradle also includes side walls 50. As best shown in FIGURE 2, the die 41 also includes a recessed face 51 which includes a flat face 52. A cutting edge is designated at 53 as best shown in FIGURE 4.

In the second station a punch holder 54 is also provided. The punch holder 54 is mounted for reciprocation within the housing 12 and a spring 55 normally urges the punch holder 54 to return to its upper position. The punch holder 54 is suitably held against forward movement in the housing 12 by means of clamping plates 39 and a clamping plate 56 suitably secured to the side wall 15 by means of screws 57. The wall 13, immediately in back of the punch holder 54, is provided with a slot 60 and a stop screw 59 is adapted to slide within the slot 60 said stop screw 59 being suitably secured to the punch holder 54. The stop screw 59 limits the upper movement of the punch holder 54.

A punch is designated at 70 as best shown in FIGURES 1 and 5. The punch 70 is provided with opposed cutting edges 71, the said cutting edges 71 diverging in an upward direction as indicated. The punch 70 is also provided with a downwardly extending narrow stop extension 72, the said punch 70 being suitably secured within a recessed slot 72' provided in the punch holder 54. The punch holder is also provided with bores 73 and 74 and screws 75 and 76 suitably engage the punch 70 to retain the same in position on the punch holder 54.

Referring now to FIGURE 6, a modified die block is indicated at 85. The die block 85 also includes securing shoulders 86 and a cradle designated generally as 87. The cradle 87 is provided to conform to the shape of a round tube and thus is provided with an arcuate lower wall 88 having at its forward end a cutting edge 89. Like the cradle 48, the cradle 87 is disposed at a 45° angle with respect to the horizontal base plate 11. The die block 85 is also provided at its forward end with a flat face 90. Referring now to FIGURES 8 and 9 a modified punch is disclosed. The punch is designated at 91 and includes a lower stop extension 92 and opposed cutting projections or cutting edges 93 which as indicated in FIGURE 9 diverge upwardly. The punch 91 comprises a main body 94 provided with suitable threaded holes 95 so that it may be secured to the punch holder 54 by means of the screws 75 and 76.

Referring now particularly to FIGURE 7 a fragmentary view, a portion of a die member is designated at 96. This die member 96 including a horizontal cradle 97, the said cradle 97 also being of arcuate shape conforming to a round tube end. A fragmentary portion of a punch holder is designated at 98 and the die 96 is provided with an arcuate cutting edge 99, defined by a recess 100 extending through the depth of the die member 96. A punch 101 conforms to the shape of the recess 100 and includes a shank 102 which is suitably secured in the punch holder 98 in suitable fashion. The punch and dies shown in FIGURES 6, 7, 8 and 9 are interchangeable with the punch and dies shown in FIGURES 1 through 5, the former being used for round tubing, the latter for rectangular tubing.

Referring now to FIGURES 10 through 14 a miter joint structure is generally designated as 103. The structure 103 may be a suitable frame, structural support, or other tubular device and includes a plurality of mitered tube ends 104. As indicated at the corner the mitered joints may be placed together and suitably brazed, or as indicated in FIGURE 10 by the tube 104 within the framework, the mitered end may be disposed against any perpendicular tubular end or wall as desired.

In the operation of the apparatus, the apparatus is placed underneath the ram of a conventional punch press, and upon lowering of the ram the punch holders 28 and 54 are moved downwardly to accomplish a shearing operation in tube ends supported within the dies. The punch holders 28 and 54 of course return of their own accord by the means of the springs 33 and 35 when the ram retracts. The operator initially square-cuts the end of a tube which may be accomplished by a suitable shearing die or by a suitable saw. The tube end is then placed into the first station within the cradle 21, over the punch 31, whereupon the punch 31 moves downwardly with the punch holder 28 to shear through one of the walls 105 of the tube end 104 to provide a slot generally designated at 106 as shown in FIGURE 11. The slot 106 is characterized by vertical sides which are perpendicular to a transverse plane through said tube 104 and the slot also includes a rear wall 108 which is perpendicular to a transverse plane through said tube end. The rear wall 108 meets the side walls 107 at opposed juncture points 109 so designated. The shearing action of the punch 31 is from the inside out and the slug drops through the slug clearance opening 19. The tube end 105 with its slot 106 is then placed in the second station of the unit and specifically within the cradle 48 where it assumes the position shown in FIGURE 4. The tube as indicated in FIGURE 4 has its rear wall 108 in engagement with the front surface of the extension 72 and thus the tube is held in position against forward movement toward the punch holder 54. The operator can also place another tube in the first station and thus upon one stroke of the press two operations are performed.

The punch holder 54 now descends downwardly and the diverging cutting edges 71 engage the tube end at the opposed junctures 109 and shear parallel to an angular plane of 45° through said tube. Generally in the preparation of conventional mitered joints the angle of course is 45°. It is a simple matter however to change the angle of the cradle 48 to effectuate different angles if it is so desired. It is apparent in FIGURES 12 and 14 that the edge 108 remains perpendicular and it is not angular as is the mitered edge 110.

In the operation for mitering a round tube as shown in FIGURES 15 and 16 wherein the tube is designated at 111 the die 85 is inserted in the second station, and the punch 91 is placed in position in the punch holder 54. Also in this case the die 96 is placed in position at the first station and the punch 101 is utilized in connection with the punch holder 28. The round tube 111 is then provided with a slot 112 in the same fashion as the rectangular tube above mentioned. The slot 112 is also characterized by perpendicular sides 113 and a perpendicular rear wall 114. By placing the round tube then into the second station, after the slot has been formed, a mitered edge 115 is effected by the operation of the die 85 and punch 91. The cutting edges 93 engage the sides 113 at junctures designated at 116 which are the terminal points of the arcuate rear wall 114.

Thus it can be seen that an effective apparatus has been provided for mitering an end on tubes by means of a shearing apparatus wherein the tube is first slotted from the inside out and subsequently the tube ends are so sheared as to provide the angular or mitered edge. It is of course obvious that the operation may be utilized in connection with all types of tubes and materials. The recess 51 in the case of rectangular tubing provides means whereby the slugs may be removed after the cutting takes place since in this case the slugs are directed outwardly by means of the cutting edges 71. In connection with the operation of the punch 91 the slugs are forced inwardly and are carried down underneath the cutting edges 93 to the slug discharge or clearance opening 18.

Thus it can be seen that an improved apparatus for mitering the edges of tubing has been described and that the objects of the invention have been fully achieved. It must be understood that changes and modifications may be made without departing from the spirit of the invention as disclosed or the scope thereof defined in the appended claims.

What is claimed is:

1. Apparatus for preparing the end of a tubular member to provide thereon a mitered end comprising:
   (a) a first female die having a first recess adapted to support and conform to the outer configuration of a tubular member,
   (b) a generally first vertical face on said first female die, said first vertical face including
   (c) a first vertical groove terminating at its upper end in said first recess and providing therewith a generally first U-shaped cutting edge,
   (d) a first punch positioned above said recess, said first punch having a second cutting edge conforming to said first cutting edge and being disposed within the end of a tube whereby during movement of said punch in sliding relation to said first vertical face said cutting edges engage each other and a relatively wide notch is sheared in said tube end to form an open end slot in the tube end,
   (e) a second female die having a second outwardly inclining recess adapted to support and conform to the outer configuration of a tube,
   (f) said second female die having a vertical flat face,
   (g) said second recess having at one end a third cutting edge,
   (h) a second punch positioned for reciprocation adjacent said vertical face,
   (i) said second punch having a generally T-shape construction including a front relatively flat face,
   (j) and a narrow elongated extension on a lower portion of said second punch, said extension having a front flat face of a dimension less than the transverse dimension of the notch sheared by said first punch,
   (k) said second punch having an upper wider portion of a substantially greater width across its front flat face than said notch on said tube end and forming with said extension on opposite sides thereof,
   (l) a pair of shoulders having oppositely outwardly extending lower fourth cutting edges,
   (m) said second punch being movable toward said second die whereby said extension initially moves through said slot and whereby said fourth cutting edges initially shear the upwardly extending wall portions of said tube adjacent said slot and progressively shear the wall of said tube end to provide a mitered end thereon,
   (n) said extension providing stop means to prevent movement of said tube in a direction toward said second punch as said tube end is sheared.

2. Apparatus in accordance with claim 1 wherein said fourth cutting edges of said shoulders diverge upwardly and outwardly from said extension.

3. Apparatus in accordance with claim 1 wherein said fourth cutting edges of said shoulders diverge downwardly and outwardly from said extension.

References Cited by the Examiner

UNITED STATES PATENTS

| 1,428,355 | 9/22  | Bradley | 83—54  |
| 2,064,539 | 12/36 | Hart    | 83—40  |
| 3,005,369 | 10/61 | Koster  | 83—40  |
| 3,073,195 | 1/63  | Koster  | 83—581 |

FOREIGN PATENTS 906,531   3/54   Germany.

ANDREW R. JUHASZ, *Primary Examiner.*

CARL W. TOMLIN, *Examiner.*